United States Patent [19]

Mine et al.

[11] Patent Number: 5,012,363
[45] Date of Patent: Apr. 30, 1991

[54] SERVO PATTERN WRITING METHOD FOR A DISK STORAGE DEVICE

[75] Inventors: Shingi Mine, Yokohama; Yoichi Miwa, Machida; Hiroyuki Ono, Fujisawa, all of Japan

[73] Assignee: International Business Machines Corporation, Armonk, N.Y.

[21] Appl. No.: 305,268

[22] Filed: Feb. 1, 1989

[30] Foreign Application Priority Data

Feb. 3, 1988 [JP] Japan ................. 63-14288

[51] Int. Cl.$^5$ ............................................. G11B 5/596
[52] U.S. Cl. ............................. 360/77.05; 360/77.08; 360/77.11
[58] Field of Search ................ 360/75, 77.05, 77, 07, 360/77.08, 78.04, 77.01, 77.11, 77.15, 15, 55, 69, 77.02, 135, 133, 15; 369/43, 47, 48, 84, 27, 93, 84, 44.27, 44.32; 358/311

[56] References Cited

U.S. PATENT DOCUMENTS

| 4,016,603 | 4/1977 | Ottesen | 360/72.2 |
| 4,149,200 | 4/1979 | Card | 360/77.02 |
| 4,584,619 | 4/1986 | Nay et al. | 360/75 |
| 4,811,135 | 3/1989 | Janz | 360/77.05 |

OTHER PUBLICATIONS

Rotating Record Disk Initialization for Sector Servoing, J. C. Dennison, IBM Technical Disclosure Bulletin, vol. 20, No. 5, Oct. 1977.

Primary Examiner—Robert L. Richardson
Attorney, Agent, or Firm—Richard E. Billion; Bradley A. Forrest

[57] ABSTRACT

In a disk drive device having multiple disks on a spindle, one of the disks is written with a servo pattern prior to assembly of the servo disk with blank disks into the disk enclosure. The servo pattern consists of a first pattern arranged on each track center along one radial direction of the disk, and a second pattern arranged along the radial direction at each position corresponding to the position of each sector. Servo patterns on each of the disks, including the original servo disk are then written on each of the disks based on the original servo disk. If the disks, when assembled exhibit eccentricity, the second pattern will still be detected, permitting servo writing without complex equipment.

11 Claims, 7 Drawing Sheets

SERVO PATTERN WRITING METHOD FOR A DISK STORAGE DEVICE

DETAILED DESCRIPTION OF THE INVENTION

1. Field of the Invention

The present invention relates to a method for writing a servo pattern which gives head positioning information on a recording surface of a disk of a magnetic disk storage device and the like.

2. Prior Art

Recently, as a physical size of a disk storage device has been reduced and a storage capacity has been increased, attention has been paid to a sector servo system as a head positioning system applicable to such a small physical size and large storage capacity disk storage device. Compared with a servo-surface-servo system using a dedicated servo surface, this system has following advantages, (1) the information required for positioning a transducer head is not recorded on non-data-recording disk, but is recorded at each sector track on a data recording surface, whereby the total recording area in the disk storage device can be effectively used, (2) since the information required for positioning the transducer head is arranged on each surface of the disk, deviation (off-track) of the head from the position of the target track due to inclination of the spindle shaft for rotating the disk can be ignored, and so forth.

FIG. 10 shows an arrangement of a servo pattern for head positioning on a recording surface in the conventional sector servo system. In the figure, each of servo patterns 3 is provided at the leading position of each section on a recording surface 2 of a disk 1. FIG. 11 shows an enlarged view of each of the servo patterns 3. Each of the servo patterns 3 includes an index servo pattern 3A and a sector servo pattern 3B. The index servo pattern 3A provides positional information on tracks (along the circle), the sector servo pattern 3B provides positional information on sectors (along the radius) and the both patterns 3A and 3B are disposed on the same track center 5. A fixed distance is provided between the two patterns 3A and between the two patterns 3B both on the adjacent tracks, and the patterns 3A and 3B are arranged discontinuously in a radial direction.

Now, in order to write the servo patterns 3 into the disk 1, the following method has been adopted. That is, after all disks have been fixed to a spindle shaft in a disk device and installed therein, a dedicated, highly accurate position detecting mechanism has been employed to write the servo patterns 3. This is because, if the disks were assembled into the disk device after writing servo patterns on the disks, it would be impossible to annul influences of errors due to the eccentricity generated in fixing the disks to the spindle shaft.

Such a conventional method was troublesome and gave low productivity, because the servo patterns had to be written on the disk while, for each of the disk devices, its shroud was removed in a contamination-free environment such as a clean room and a highly accurate position detecting mechanism using lasers or a clock head had to be employed.

OBJECT OF THE INVENTION

As described above, it is a problem that depending on the conventional technology, the processes of the writing operation of servo patterns constitutes a large part of the cost of the products.

An object of the present invention is to provide a method which allows servo patterns to be written with high productivity.

SUMMARY OF THE INVENTION

In order to accomplish the above-mentioned object, the present invention employs the following steps. In the present invention, the process for writing servo patterns is divided into a pre-operation carried out before the disks are installed into the disk device (fixed to the spindle shaft) and a post-operation that is carried out after the installation. In the pre-operation, patterns written on the recording surface of the disk are the following two base patterns, namely, (a) a first base pattern arranged on each track center along one radial direction of the disk and (b) a second base pattern arranged along the radial direction at each position corresponding to the position of the sector in a substantially continuous fashion (see Block A in FIG. 1). Then, the disks are assembled or installed into the disk device together with blank disks (see Block B in FIG. 1). In the post-operation, the servo patterns are written based on the first and second base patterns (see Block C in FIG. 1). Here, the expression "substantially continuous fashion" also includes the case where the number of discontinuous portions is smaller than that of the first base pattern even if some discontinuous portions are present in the base pattern, besides the case where the base pattern is completely continuous along the radial direction.

According to this invention, since the above-mentioned second base patterns are formed substantially continuously along the radial direction, even if an eccentricity attachment to the spindle occur when the disks, on which the first and second base patterns have been already written are fixed to the spindle, the head used in the post-operation can always pass through the above-mentioned second base patterns while the disk is rotating. In other words, in spite of occurrence of the eccentricity, the head can get information about positions of a predetermined waveform (on sector positions). Accordingly, if the pre-operation is done at the same time for a plurality of disks, and the post-operation is done by using the disks obtained by such a way, the post-operation does not necessarily need to be done in a clean room, and the ability of the position detecting mechanism usable in the post-operation is not required to detect absolute positions but only relative positions. Since highly accurate position detection with respect to absolute positions is not required, the servo patterns writing operations become simple, and the complex equipment is not required.

PREFERRED EMBODIMENT

Hereinafter, an embodiment according to the present invention will be described in detail with reference to the drawings.

Figure 1:
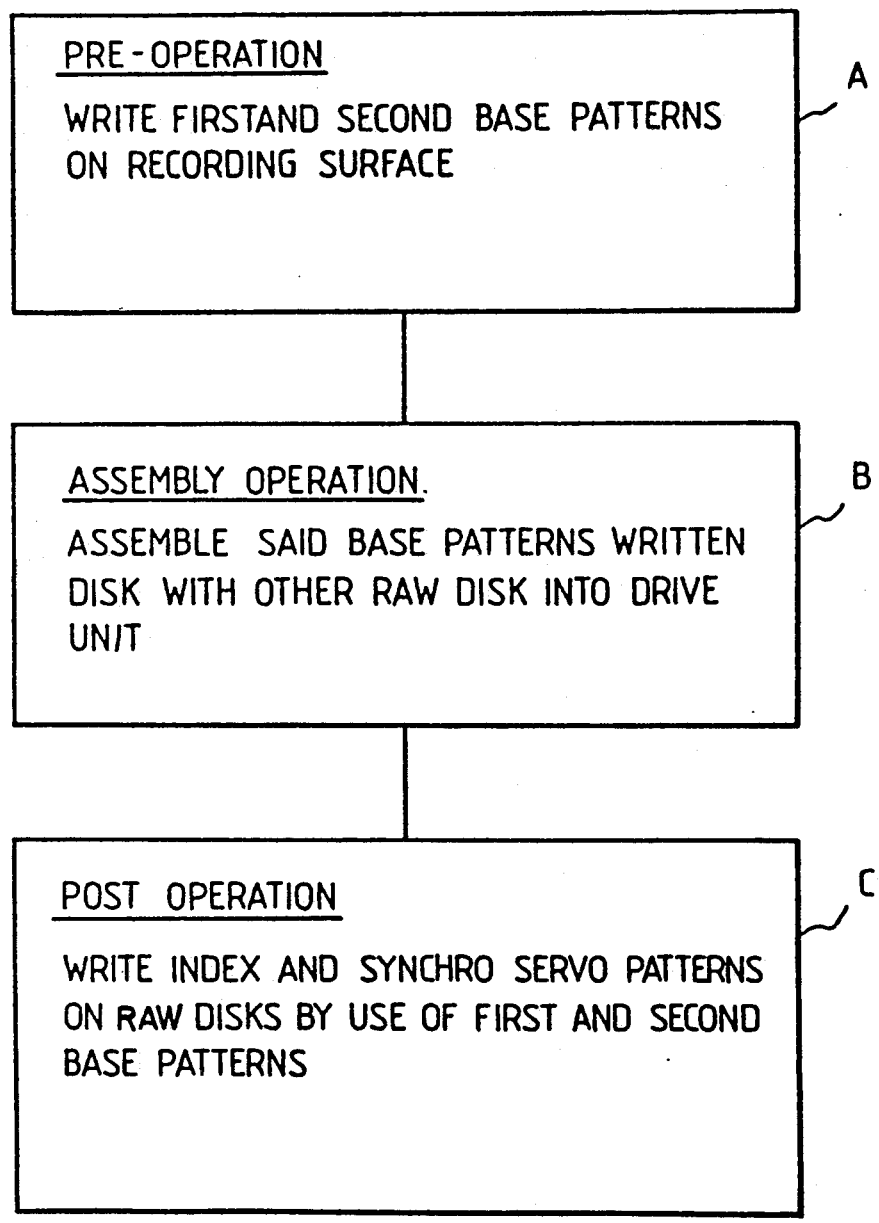
FIG. 1 is a flowchart showing a servo pattern writing method according to the present invention.
Figure 2:
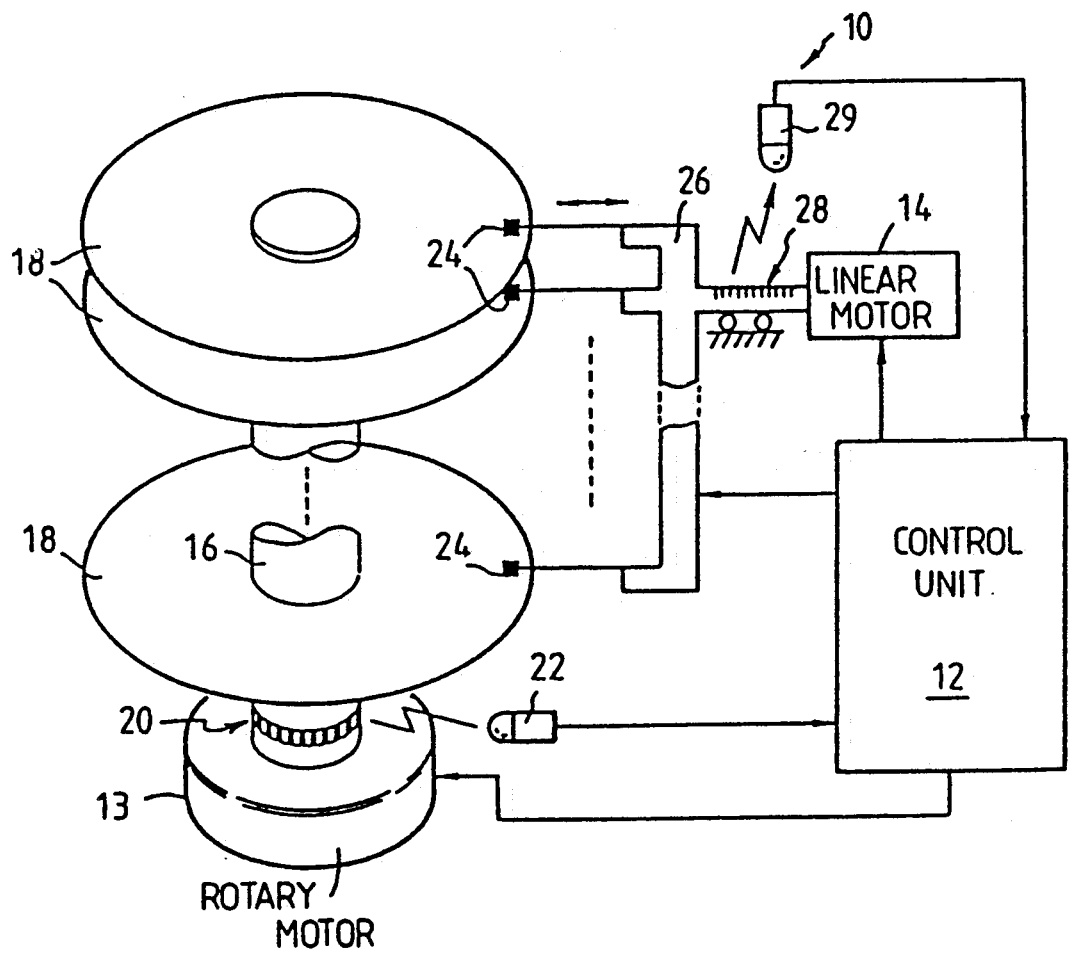
FIG. 2 is a perspective view showing a base pattern writing device used in a pre-operation in an embodiment according to the present invention.

FIG. 2 shows a writing device 10 for writing base patterns, which is employed in a pre-operation.

The writing device 10 is not a disk storage device itself, and includes a rotary motor 13 and a linear motor 14, both operating under the control of a control unit 12. A plurality of disks 18 are mounted on a spindle shaft 16 coupled with the rotary motor 13, and their positions in the direction of rotation can be detected with high accuracy by precise patterns 20 provided along the circumferential direction on the surface of the circumference of the spindle 16 and a sensor 22 fixed to the spindle shaft.

Also, each writing head 24 is located on one side of each disk 18, and these heads 24 are coupled with the linear motor 14 through a common carriage 26. The carriage 26 includes precise patterns 28 along the direction of movement thereof, that is, the radial direction of the disk 18. The position of the head in the radial direction of the disk 18 is detected with high accuracy by the precise patterns 28 and a sensor 29 stationary with regard to the carriage 26.

Figure 3:
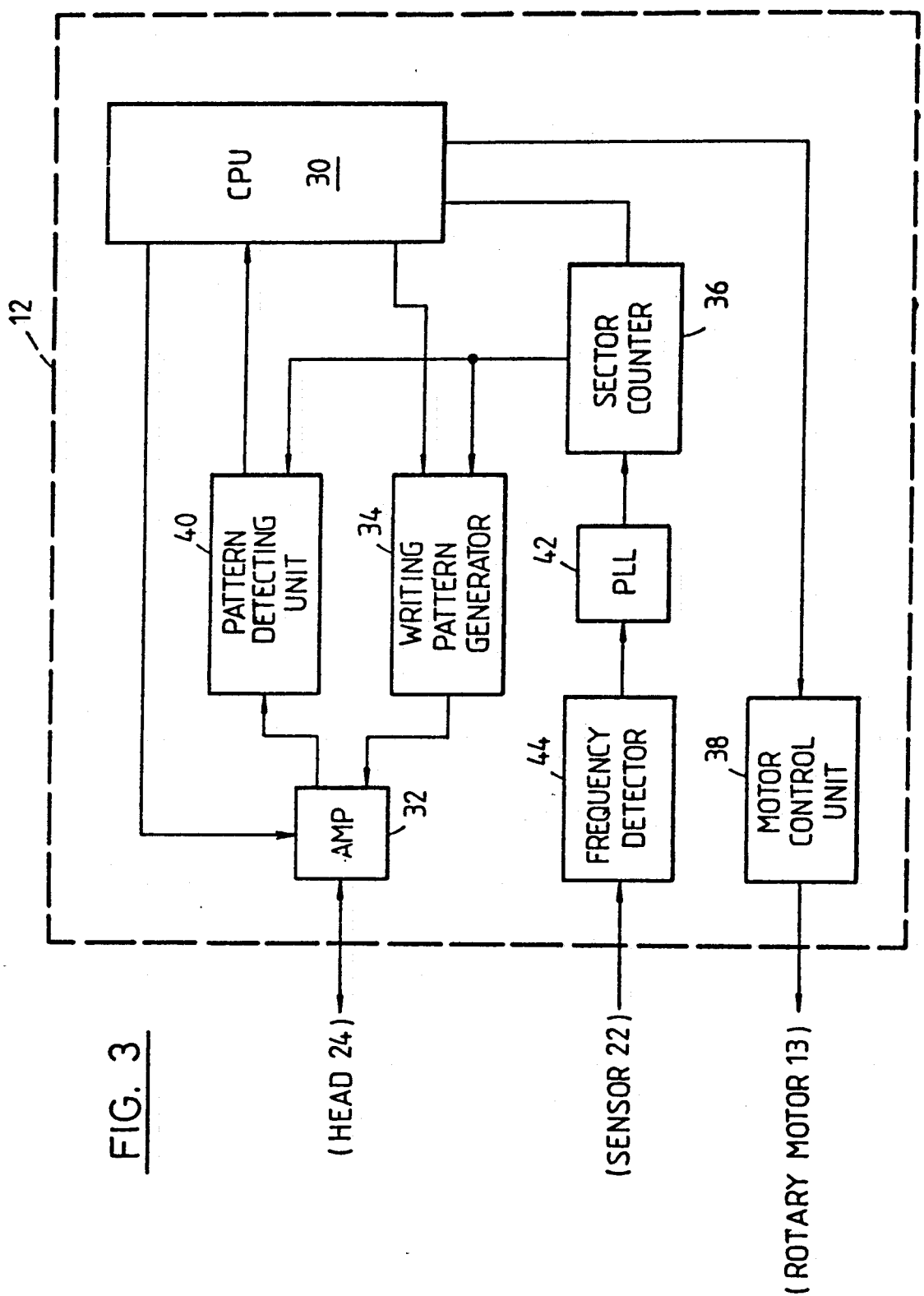
FIG. 3 is a block diagram showing a constitution of a control unit of the above-mentioned base pattern writing device.
Figure 4:
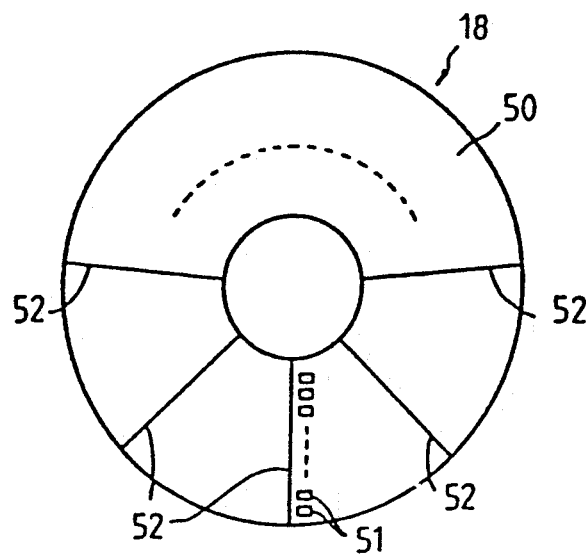
FIG. 4 is a plane view showing base patterns written in the pre-operation.

FIG. 3 shows a structure of the control unit 12 relating to the rotation of the disk 18. The control unit 12 includes a CPU 30, which supplies a control signal to a head driving amplifier 32, a writing pattern generator 34, a sector counter 36, and a motor controlling unit 38, and receives a detected signal from a pattern detecting unit 40. The sector counter 36 is supplied through a PLL 42 with signals corresponding to the positions of angles of rotation of the disk 18 from a frequency detector 44 to count the number of the signals. When the number of the signals amounts to a specified count, the sector counter 36 supplies a certain output signal to the pattern detecting unit 40 and the writing pattern generator 34. The writing pattern generator 34 supplies a writing signal to the amplifier 32 in response to the signal from the sector counter 36, and the pattern detecting unit 40 supplies a read-out signal to the CPU 30 in response to the signal from the sector counter 36. FIG. 4 shows the first and second base patterns which have been written in the pre-operation. In the figure, the first and second base patterns 51 and 52 are shown on the recording surface 50 of the disk 18. The first base pattern 51 has been written at a position of an angle of circumference along the radial direction, while the second base pattern 52 has been written at angular intervals corresponding to positions of the sectors.

Figure 5:
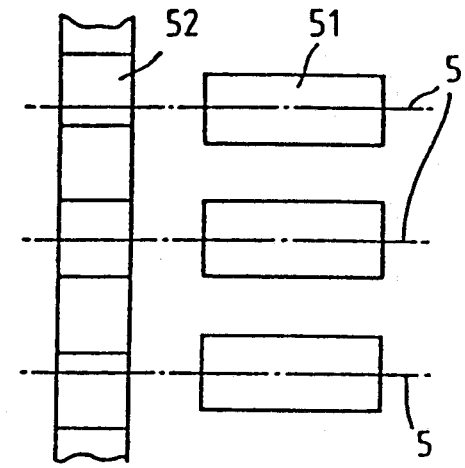
FIG. 5 is a plane view showing said base patterns after magnification.
Figure 10:
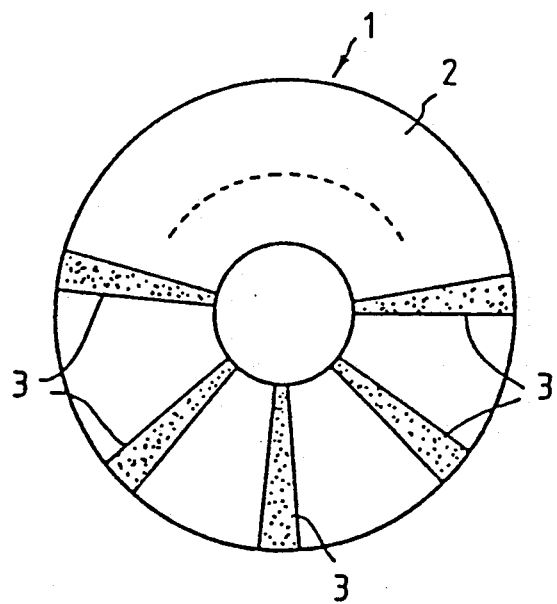
FIG. 10 and FIG. 11 are plane views showing the servo patterns and the plane views after magnification, respectively.
Figure 11:
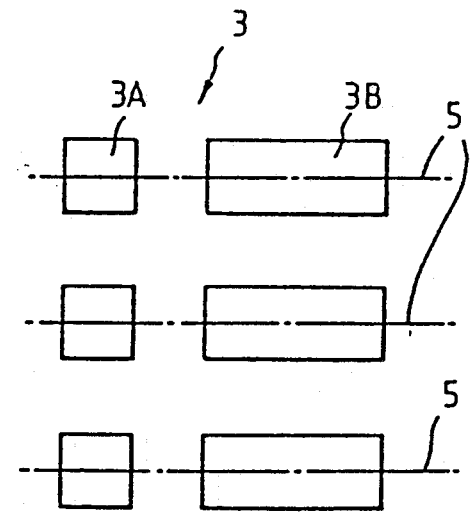

FIG. 5 shows an enlarged view of the base patterns 51 and 52. The distance between the centers of the adjacent first base patterns 51 along the radial direction is made equal to that between the centers of the adjacent tracks, and the first base patterns 51 are for providing positional information about the tracks (positional information along the radial direction). The second base pattern 52 is formed substantially continuously along the radial direction, and especially, in the embodiment shown in the drawing, the second base pattern 52 is formed in a completely continuous state along the radial direction. The second base pattern 52 is for providing positional information on the sectors (positional information in the direction of rotation). Since the pattern 52 is continuous along the radial direction, the head can always obtain positional information in the direction of rotation while the disks rotate in the post-operation.

Figure 6:
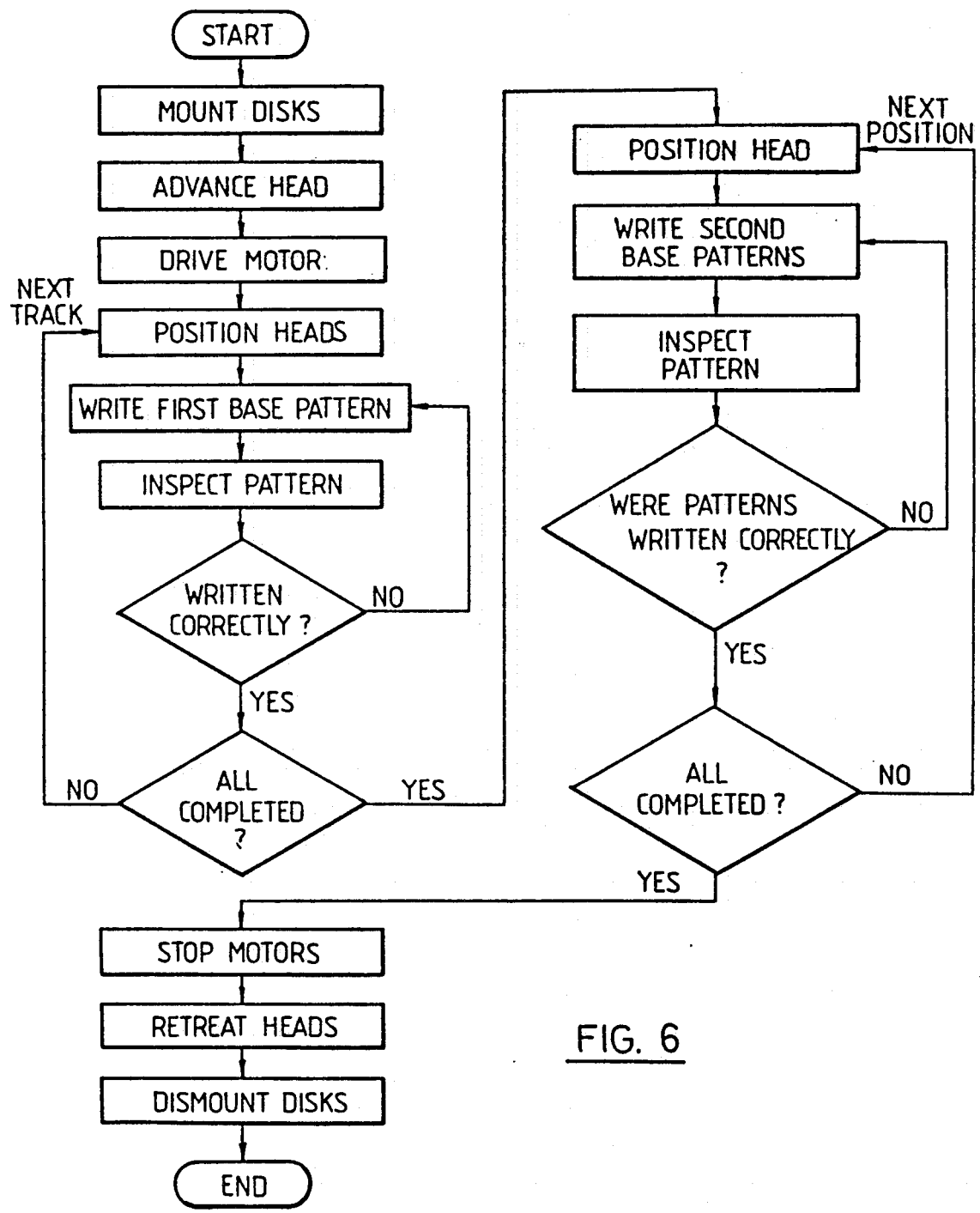
FIG. 6 is a flowchart showing the pre-operation.

FIG. 6 shows a flowchart of the pre-operation. In the present embodiment, the second base patterns 52 are written after completion of the writing of the first base patterns 51.

The disks 18 on which the first and second base patterns 51 and 52 have been written are assembled into the disk device in the assembly operation, together with the disks on which the base patterns have not been written, that is, the disks before writing (blank or raw disks). Here, the disks 18 are fixed to the spindle shaft of the disk device.

Now, the post-operation will be described.

Figure 7:
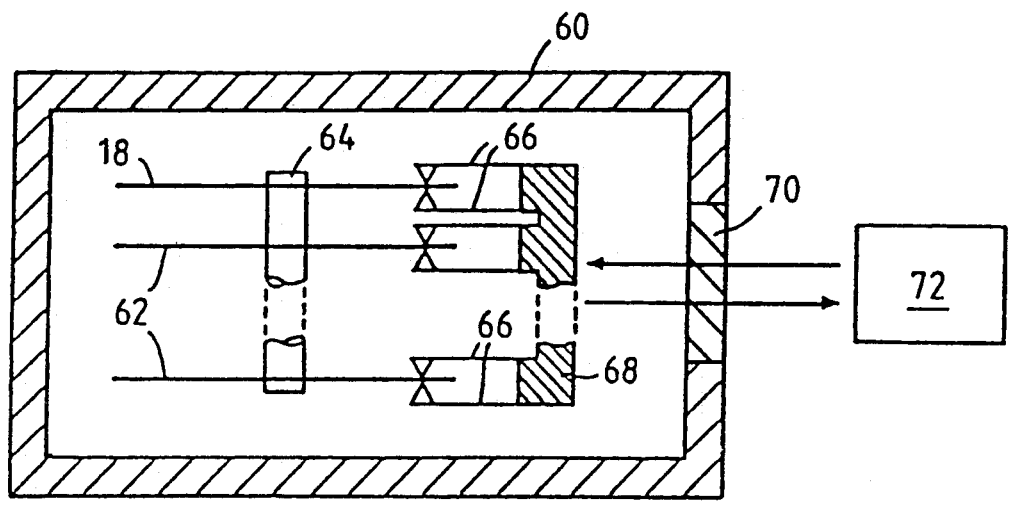
FIG. 7 is a sectional view showing an optical position detecting mechanism and a disk pack used in a post-operation.

FIG. 7 shows a state in which the disk 18 is already installed with blank disks into the disk device. In the figure, one disk 18 on which the base patterns have been written and a plurality of blank disks 62 are contained in a disk pack 60 with them fixed to the spindle shaft 64. Heads 66 are disposed on the both surfaces of the disk 18 and on those of each of the blank disks 62. A plurality of the heads 66 are moved along the radial direction by a common carriage 68. A transparent window 70 is provided at one part of the disk pack 60, and an optical position detecting means 72 is located on the outside of the window 70. Movement of the carriage 68 is detected through the window 70 by the optical position detecting means 72. The means 72 is not one for obtaining the absolute value of an amount of movement but carries out its work sufficiently if it can be confirmed that the heads 66 are stopping during rotation of the disks. Accordingly, variations in the reflectivity and the thickness of the window 70 do not interfere with the post-operation at all.

Figure 8:
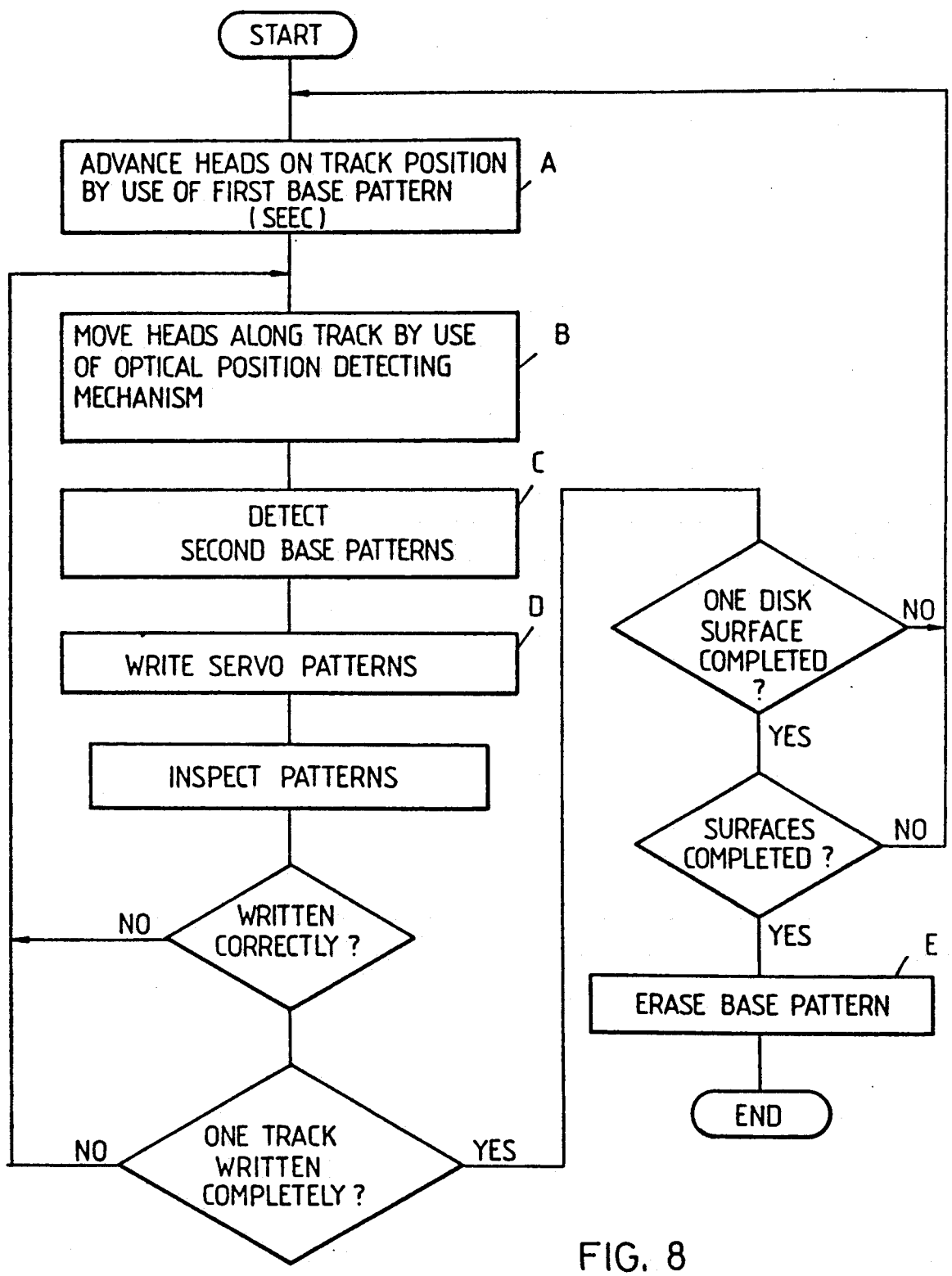
FIG. 8 is a flowchart showing the post-operation.

FIG. 8 shows a flowchart of the post-operation. In the post-operation, the heads 66 are caused to seek-operate to position the heads 66 on the first track based on the first base patterns 51 (see Block A in FIG. 8). Then, the spindle shaft 64 is made to rotate with the head 66 fixed, using the optical position detecting mechanism 72 (see Block B in FIG. 8) to read out the second base patterns 52 with the head 66 on the disk 18 set at the read-out mode (Block C). The servo patterns 3 are written on the recording surface of the blank disk 62 in synchronism with the read-out second base patterns 52 (Block D).

Figure 9:
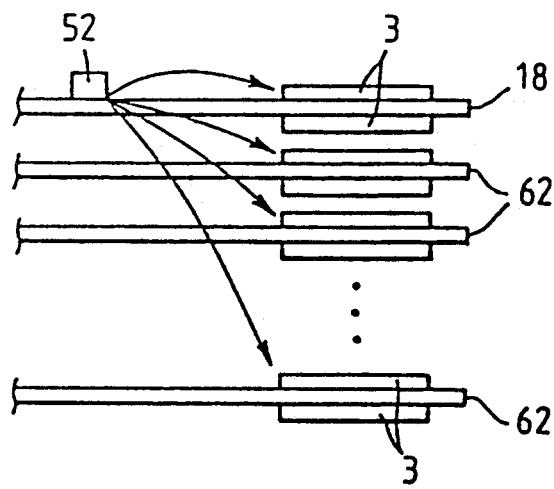
FIG. 9 is a front view showing a writing state for servo patterns based on the second base patterns in the post-operation.

FIG. 9 shows a state in which the servo patterns 3 are written on the disks 62 based on the second base pattern 52 on the disk 18 by the above-mentioned method. As shown in the figure, in the present embodiment, the servo patterns 3 are written on the recording surfaces of the disk 18 itself, and the first and second base patterns 51 and 52 which have been written on the disk 18 are finally erased (see Block E in FIG. 8). The disk 18 is utilized as a recording disk in the same way as the other disks 62.

In the present embodiment, although the pre-operation has to be performed in a clean room, the base patterns 51 and 52 can be written on a plurality of disks 18 at a time. Accordingly, since it is unnecessary to carry out the post-operation in the clean room, the method according to the present invention is superior in productivity to the conventional method in which servo patterns have been written in the clean room for each disk storage device.

In the post-operation, this embodiment is superior in productivity to the latter in that it does not require a lot of time and labor for removing shrouds.

Because the optical position detecting means 72 used in the post-operation carries out its work sufficiently if a fixed state of the heads 66 can be detected, it may be a simple mechanism, while only the addition of a simple construction providing a transparent window 70 on the side of the disk pack 60 is sufficient, the share of expenses required for the post-operation is slim.

In place of the optical position detecting means 72 in the above-mentioned embodiment, a mechanism for detecting the absolute position may be used. In general, in the case where an external absolute position detecting mechanism is used, there sometimes occurs a problem with regard to accuracy due to factors of temperature drift, vibration and the like. But, calibration in positioning can be easily performed by using the base patterns 51 and 52 auxiliary. Though poor in accuracy, it is possible to carry out the post-operation without any external position detecting mechanism.

EFFECT OF THE INVENTION

According to the present invention as described above, it is possible to write the servo patterns efficiently.

What is claimed is:

1. A method for writing a servo pattern onto a data surface in a disk storage device, said disk storage device including disks having radials, said servo pattern providing a track and a sector positions information, said method including the steps of:
    writing first and second base patterns onto a data surface of a base patterns written disk, said first base pattern being arranged along at least one radial of the disk and written at intervals along the radial, and having the same radial interval as the radial interval of the tracks to be written, said second base pattern being arranged at each position of the sector to be written along the radius direction continuously;
    assembling said base patterns written disk with other un-written disks into a disk device; and
    writing the servo pattern onto the data surface of the other un-written disks, based on the first and second base patterns on the base patterns written disk.

2. A method for producing servo information in a disk drive having at least two disks mounted on a spindle for simultaneous rotation and having a data head associated with each disk surface for writing data to each surface of the disks, said method comprising the steps of:
    producing patterns on a first disk;
    mounting the first disk on a spindle and mounting at least one other disk on said spindle; and
    writing servo information on said at least one other disk using the data head associated with said one other disk, said servo information on said at least one other disk positioned on said one at least one other disk by referring to the patterns written on said first disk.

3. The method for producing servo information in a disk drive of claim 2 wherein the step of producing patterns on a first disk further comprises the steps of:
    producing a first pattern on said first disk; and
    producing a second pattern on said first disk.

4. The method for producing servo information in a disk drive of claim 3 wherein the step of producing a first pattern on said first disk further comprises the step of writing information for positioning the tracks on said at least one other disk.

5. The method for producing servo information in a disk drive of claim 4 wherein the step of writing information for positioning the tracks on said at least one other disk includes writing a plurality of track locating patterns along a radial of the disk, said plurality of track locating patterns spaced from adjacent track locating patterns, the space between adjacent track locating patterns substantially equalling the space between the centers of adjacent tracks on said at least one other disk.

6. The method for producing servo information in a disk drive of claim 3 wherein the step of producing a second pattern on said first disk further comprises the step of writing information for positioning the sectors on said tracks on said at least one other disk.

7. The method for producing servo information in a disk drive of claim 6 wherein the step of writing information for positioning the sectors on said tracks on said at least one other disk comprises writing a continuous pattern along at least one radial of the disk.

8. The method for producing servo information in a disk drive of claim 6 wherein the step of writing information for positioning the sectors on said tracks on said at least one other disk comprises writing said continuous pattern along a plurality of radials of the disk, each of said radials forming a substantially equal angle with respect to an adjacent radial.

9. The method of claim 2 further comprising the step of erasing the patterns on the first disk after writing the servo information on said at least one other disk.

10. The method of claim 9 further comprising the step of reproducing the servo information on the first disk from the servo information on said at least one other disk.

11. An apparatus for producing servo information in a disk drive having at least two disks mounted on a spindle for simultaneous rotation and having a data head associated with each disk surface for writing data to each surface of the disks, said apparatus comprising:
    means for producing patterns on a first disk;
    means for mounting the first disk on a spindle and mounting at least one other disk on said spindle; and
    means for writing servo information on said at least one other disk using the data head associated with said one other disk, said servo information on said at least one other disk positioned on said one at least one other disk by referring to the patterns written on said first disk.

* * * * *